(12) United States Patent
Li et al.

(10) Patent No.: US 12,401,792 B2
(45) Date of Patent: Aug. 26, 2025

(54) DATA PROCESSING IN EDGE OFFSET MODE OF SAMPLE ADAPTIVE OFFSET

(71) Applicant: SHANGHAI BILIBILI TECHNOLOGY CO., LTD., Shanghai (CN)

(72) Inventors: Xiaobo Li, Shanghai (CN); Tianxiao Ye, Shanghai (CN)

(73) Assignee: SHANGHAI BILIBILI TECHNOLOGY CO., LTD., Shanghai (CN)

(*) Notice: Subject to any disclaimer, the term of this patent is extended or adjusted under 35 U.S.C. 154(b) by 4 days.

(21) Appl. No.: 18/336,874

(22) Filed: Jun. 16, 2023

(65) Prior Publication Data
US 2023/0336723 A1  Oct. 19, 2023

Related U.S. Application Data

(63) Continuation of application No. PCT/CN2022/072846, filed on Jan. 20, 2022.

(30) Foreign Application Priority Data

Feb. 24, 2021  (CN) .......................... 202110209617.4

(51) Int. Cl.
| | |
|---|---|
| *H04N 19/119* | (2014.01) |
| *H04N 19/169* | (2014.01) |
| *H04N 19/176* | (2014.01) |
| *H04N 19/182* | (2014.01) |

(52) U.S. Cl.
CPC ......... *H04N 19/119* (2014.11); *H04N 19/176* (2014.11); *H04N 19/182* (2014.11); *H04N 19/1883* (2014.11)

(58) Field of Classification Search
CPC .. H04N 19/119; H04N 19/176; H04N 19/182; H04N 19/1883
See application file for complete search history.

(56) References Cited

U.S. PATENT DOCUMENTS

| | | |
|---|---|---|
| 2007/0070243 A1 | 3/2007 | Zhu |
| 2011/0122950 A1 | 5/2011 | Ji et al. |

(Continued)

FOREIGN PATENT DOCUMENTS

| | | |
|---|---|---|
| CN | 103404137 A | 11/2013 |
| CN | 104219520 A | 12/2014 |

(Continued)

OTHER PUBLICATIONS

EESR of the counterpart EP application No. 22758720.1, official mailing date: Apr. 5, 2024, 10 pages.

(Continued)

*Primary Examiner* — Dave Czekaj
*Assistant Examiner* — Shanika M Brumfield
(74) *Attorney, Agent, or Firm* — FisherBroyles, LLP

(57) ABSTRACT

Techniques for data processing in an edge offset mode of sample adaptive offset are provided. The techniques include: traversing reconstructed pixels in a coding tree block, and calculating a residual value between each reconstructed pixel and original pixel; traversing all first reconstructed pixels in a non-boundary part of the coding tree block, and calculating a category of each traversed first reconstructed pixel in each direction; traversing all second reconstructed pixels in a boundary part of the coding tree block, and calculating a category of each traversed second reconstructed pixel along a single direction; and calculating an accumulated residual value of reconstructed pixels along the four directions and an accumulated number of reconstructed pixels under the category based on the category of each first reconstructed pixel the edge offset modes along the four directions, the category of each second reconstructed pixel along the single direction, and each residual value.

17 Claims, 5 Drawing Sheets

(56) References Cited

U.S. PATENT DOCUMENTS

| | | | |
|---|---|---|---|
| 2012/0177107 A1* | 7/2012 | Fu | H04N 19/70 |
| | | | 375/240.03 |
| 2013/0022103 A1* | 1/2013 | Budagavi | H04N 19/82 |
| | | | 375/E7.135 |
| 2013/0177067 A1 | 7/2013 | Minoo et al. | |
| 2014/0334536 A1 | 11/2014 | Sze et al. | |
| 2014/0376608 A1* | 12/2014 | Tourapis | H04N 19/463 |
| | | | 375/240.02 |
| 2015/0010052 A1 | 1/2015 | Mody et al. | |
| 2015/0093039 A1 | 4/2015 | Li et al. | |
| 2016/0286226 A1* | 9/2016 | Ridge | H04N 19/30 |
| 2018/0020215 A1 | 1/2018 | Ramamurthy et al. | |
| 2022/0295054 A1* | 9/2022 | Zhao | H04N 19/117 |

FOREIGN PATENT DOCUMENTS

| | | |
|---|---|---|
| CN | 105141948 A | 12/2015 |
| CN | 106131554 A | 11/2016 |
| CN | 109963160 A | 7/2019 |
| CN | 112927324 A | 6/2021 |
| EP | 3177014 A1 | 6/2017 |

OTHER PUBLICATIONS

PCT/CN2022/072846, International Search Report, official mailing date: Apr. 19, 2022, 6 pages.

CN202110209617.4, Notification to Grant, issued May 7, 2022, 9 pages.

Wang et al., "Fast Sample Adaptive Offset Jointly Based on HOG Features and Depth Information for VVC in Visual Sensor Networks", Sensors, MDPI, Nov. 26, 2020, 18 pages.

Summons to oral proceedings of the counterpart EP application No. 22758720.1 (Official mailing date:Apr. 23, 2025), 12 pages.

Chih-Ming Eu et al: "Sample Adaptive Offset in the HEVC Standard," IEEE Transactions on Circuits and Systems for Video Technology, IEEE, USA, vol. 22, No. 12, Dec. 1, 2012 (Dec. 1, 2012), pp. 1755-1764, XP011487153.

* cited by examiner

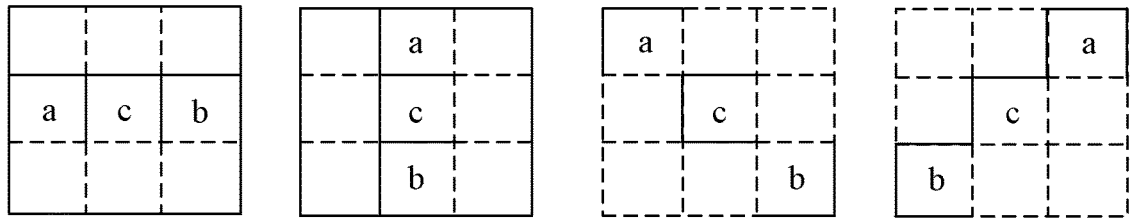

FIG. 3

```
┌─────────────────────────────────────────────────────────────┐
│ Traverse all first reconstructed pixels, and store a        │──── S40
│ category of each first reconstructed pixel in each of the   │
│ edge offset modes along four directions into a variable in  │
│ a concatenation manner                                      │
└─────────────────────────────────────────────────────────────┘
                              │
                              ▼
┌─────────────────────────────────────────────────────────────┐
│ Obtain, from the variable, the category of each first       │──── S41
│ reconstructed pixel in each of the edge offset modes along  │
│ the four directions                                         │
└─────────────────────────────────────────────────────────────┘
                              │
                              ▼
┌─────────────────────────────────────────────────────────────┐
│ Calculate an accumulated residual value of reconstructed    │
│ pixels under each of different categories in each of the    │──── S42
│ edge offset modes along the four directions based on the    │
│ category of each first reconstructed pixel in each of the   │
│ edge offset modes along the four directions, a category of  │
│ each second reconstructed pixel in an edge offset mode      │
│ along a single direction, and each residual value.          │
└─────────────────────────────────────────────────────────────┘
```

FIG. 4

Apparatus 50 for data processing in an edge offset mode of sample adaptive offset 51 Obtaining means 52 First traversal means 53 Second traversal means 54 Third traversal means 55 Calculation means

FIG. 5

DATA PROCESSING IN EDGE OFFSET MODE OF SAMPLE ADAPTIVE OFFSET

CROSS-REFERENCE TO RELATED APPLICATIONS

This application is a continuation under 35 U.S.C. 111(a) of PCT International Application No. PCT/CN2022/072846, filed on Jan. 20, 2022, which claims priority to Chinese Patent Application No. 202110209617.4, filed on Feb. 24, 2021, the entire contents of which are hereby incorporated by reference in their entirety for all purposes.

TECHNICAL FIELD

The present application relates to data processing technologies, and in particular, to data processing in an edge offset mode of sample adaptive offset.

BACKGROUND

High Efficiency Video Coding (HEVC) is a video compression standard. After a video is compressed through HEVC, to reduce a distortion between a reconstructed image and an original image, pixel compensation is performed on the reconstructed image by using a sample adaptive offset (SAO) technology.

When pixel compensation is performed by using the SAO technology, pixel compensation may be implemented in an edge offset (EO) mode or a band offset (BO) mode. The EO technology categorizes a current reconstructed pixel by comparing a size of the current reconstructed pixel with a size of an adjacent pixel. Based on position differences of pixels to be selected, the edge offset is implemented along four directions: a horizontal direction (EO0), a vertical direction (EO1), a 135° direction (EO2), and a 45° direction (EO3).

In the implementation process of the existing EO mode, a separate function will be written for each EO direction, that is, four functions need to be written for the four EO directions, and each function is used to complete the calculation of a category of a pixel in the corresponding direction, and implement a process of calculating residuals and the number.

SUMMARY

The present application provides a method for data processing in an edge offset mode of sample adaptive offset, including:

obtaining a target reconstructed image, and dividing the target reconstructed image into a plurality of non-overlapping coding tree blocks;

traversing all reconstructed pixels in each coding tree block, and calculating a residual value between each reconstructed pixel and a corresponding original pixel;

traversing all first reconstructed pixels in a non-boundary part of the coding tree block, and calculating a category of each traversed first reconstructed pixel in each of edge offset modes along four directions, where the four directions include a horizontal direction, a vertical direction, a 135° direction, and a 45° direction;

traversing all second reconstructed pixels in a boundary part of the coding tree block, and calculating a category of each traversed second reconstructed pixel in an edge offset mode along a single direction; and calculating an accumulated residual value of reconstructed pixels under each of different categories in each of the edge offset modes along the four directions and an accumulated number of reconstructed pixels under the category based on the category of each first reconstructed pixel in each of the edge offset modes along the four directions, the category of each second reconstructed pixel in the edge offset mode along the single direction, and each residual value.

Optionally, the calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value includes:

traversing all the first reconstructed pixels, and storing the category of each first reconstructed pixel in each of the edge offset modes along the four directions into a variable in a concatenation manner;

obtaining, from the variable, the category of each first reconstructed pixel in each of the edge offset modes along the four directions; and calculating the accumulated residual value of reconstructed pixels under each of the different categories in each of the edge offset modes along the four directions based on the category of each first reconstructed pixel in each of the edge offset modes along the four directions, the category of each second reconstructed pixel in the edge offset mode along the single direction, and each residual value.

Optionally, the calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value further includes:

traversing all the second reconstructed pixels, and storing the category of each second reconstructed pixel in the edge offset mode along the single direction into the variable in a concatenation manner, where a category of each second reconstructed pixel in each of the edge offset modes along the other directions is represented by a preset value; and the obtaining, from the variable, the category of each first reconstructed pixel in each of the edge offset modes along the four directions includes:

obtaining, from the variable, the categories of all the reconstructed pixels in the edge offset modes along the four directions.

Optionally, there are five categories, each category is represented by four bits, and the categories of each reconstructed pixel in the edge offset modes along the four directions are represented by 16 bits.

Optionally, the obtaining, from the variable, the categories of all the reconstructed pixels in the edge offset modes along the four directions includes:

performing an and operation on the variable and a preset 16-bit value, and using an operation result as a category, stored in the variable, of each reconstructed pixel in an edge offset mode along one direction;

performing a 4-bit shift on the variable to obtain an updated variable;

performing an and operation on the updated variable and the preset 16-bit value, and using an operation result as a category of the reconstructed pixel in an edge offset mode along another direction; and returning to perform the step of performing a 4-bit shift on the variable to obtain an updated variable, until the categories of each reconstructed pixel in the edge offset modes along all the directions are obtained.

Optionally, the preset 16-bit value is 0x000f, and the performing a 4-bit shift on the categories, represented by 16 bits, of each obtained reconstructed pixel in the edge offset modes along the four directions to obtain categories after the shift includes:

performing a 4-bit right shift on the categories, represented by 16 bits, of each obtained reconstructed pixel in the edge offset modes along the four directions to obtain categories after the right shift.

Optionally, the preset 16-bit value is 0xf000, and the performing a 4-bit shift on the categories, represented by 16 bits, of each obtained reconstructed pixel in the edge offset modes along the four directions to obtain categories after the shift includes:

performing a 4-bit left shift on the categories, represented by 16 bits, of each obtained reconstructed pixel in the edge offset modes along the four directions to obtain categories after the left shift.

Optionally, the step of calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value includes:

calculating an accumulated residual value of reconstructed pixels under each of all the categories except a preset category in each of the edge offset modes along the four directions based on the category of each first reconstructed pixel in each of the edge offset modes along the four directions, the category of each second reconstructed pixel in the edge offset mode along the single direction, and each residual value.

The present application further provides an apparatus for data processing in an edge offset mode of sample adaptive offset, including:

an obtaining means configured to obtain a target reconstructed image, and divide the target reconstructed image into a plurality of non-overlapping coding tree blocks;

a first traversal means configured to traverse all reconstructed pixels in each coding tree block, and calculate a residual value between each reconstructed pixel and a corresponding original pixel;

a second traversal means configured to traverse all first reconstructed pixels in a non-boundary part of the coding tree block, and calculate a category of each traversed first reconstructed pixel in each of edge offset modes along four directions, where the four directions include a horizontal direction, a vertical direction, a 135° direction, and a 45° direction;

a third traversal means configured to traverse all second reconstructed pixels in a boundary part of the coding tree block, and calculate a category of each traversed second reconstructed pixel in an edge offset mode along a single direction; and a calculation means configured to calculate an accumulated residual value of reconstructed pixels under each of different categories in each of the edge offset modes along the four directions and an accumulated number of reconstructed pixels under the category based on the category of each first reconstructed pixel in each of the edge offset modes along the four directions, the category of each second reconstructed pixel in the edge offset mode along the single direction, and each residual value.

The present application further provides a computer device including a memory, a processor, and computer-readable instructions stored on the memory and capable of running on the processor, where when the processor executes the computer-readable instructions, the steps of the method as described above are implemented.

The present application further provides a computer-readable storage medium having computer-readable instructions stored thereon, where when the computer-readable instructions are executed by a processor, the steps of the method as described above are implemented.

BRIEF DESCRIPTION OF THE DRAWINGS

FIG. 3 is a schematic diagram of edge offset modes along four directions according to the present application;

FIG. 4 is a detailed schematic flowchart of a step of calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value, according to an implementation of the present application;

FIG. 5 is a diagram of program means of an embodiment of an apparatus for data processing in an edge offset mode of sample adaptive offset according to the present application.

DETAILED DESCRIPTION OF EMBODIMENTS

Figure 1:
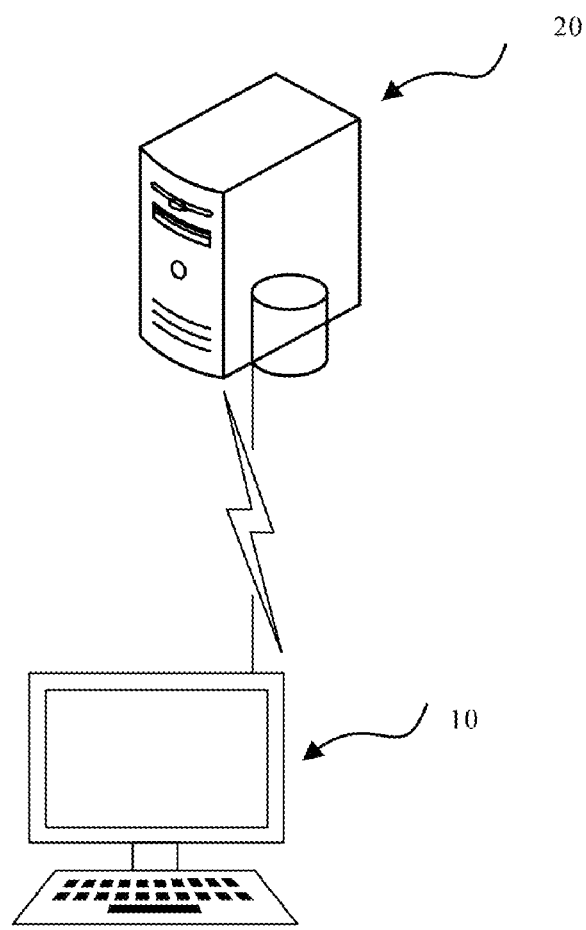
FIG. 1 is a schematic diagram of an environment for a method for data processing in an edge offset mode of sample adaptive offset according to an embodiment of the present application.

The advantages of the present application are further described below with reference to accompanying drawings and embodiments.

Exemplary embodiments are illustrated in detail here, and examples thereof are shown in the accompanying drawings. When the following description refers to the figures, the same numerals in different figures represent the same or similar elements unless otherwise indicated. The implementations described in the following exemplary embodiments do not represent all implementations consistent with the present disclosure. Instead, they are merely examples of apparatuses and methods consistent with some aspects of the present disclosure as detailed in the appended claims.

The terms used in the present disclosure are merely for the purpose of describing embodiments, and are not intended to limit the present disclosure. The terms "a/an", "said", and "the" in the singular form used in the present disclosure and the appended claims are also intended to include the plural form unless otherwise clearly indicated in the context. It should also be understood that the term "and/or" used herein refers to and includes any or all possible combinations of one or more of the associated listed items.

It should be understood that although the terms, such as first, second, and third, may be used in the present disclosure to describe various types of information, such information should not be limited to these terms. These terms are merely used to distinguish the same type of information from one another. For example, without departing from the scope of the present disclosure, first information may alternatively be referred to as second information, and similarly, second information may alternatively be referred to as first information. Depending on the context, the word "if" as used herein may be interpreted as "when" or "upon" or "in response to determining".

In the description of the present application, it should be understood that, the reference numerals of steps do not indicate the order of execution of the steps, but are merely to facilitate the description of the present application and differentiation between the steps, and thus will not be interpreted as limiting the present application.

The inventors found that, in the above-mentioned EO technology, it is necessary to read a reconstructed pixel four times, which will consume a lot of time and seriously affect the performance of SAO.

In view of this, a method for data processing in an edge offset mode of sample adaptive offset, a computer device, and a computer-readable storage medium are currently provided, to resolve a problem that the calculation of a category of each pixel in an EO mode along each direction and residuals and the number is time-consuming, which are described one by one in detail in the following embodiments.

FIG. 1 is a schematic architectural diagram of a method for data processing in an edge offset mode of sample adaptive offset according to an embodiment of the present application. In an exemplary embodiment, a system of the application environment may include a computer device 10 and a server 20. A wireless or wired connection is formed between the computer device 10 and the server 20. The computer device 10 may be a mobile phone, an iPad, a tablet computer, a server, or the like. The sever 20 may be a rack server, a blade server, a tower server, or a cabinet server (including an independent server or a server cluster that includes a plurality of servers).

Figure 2:
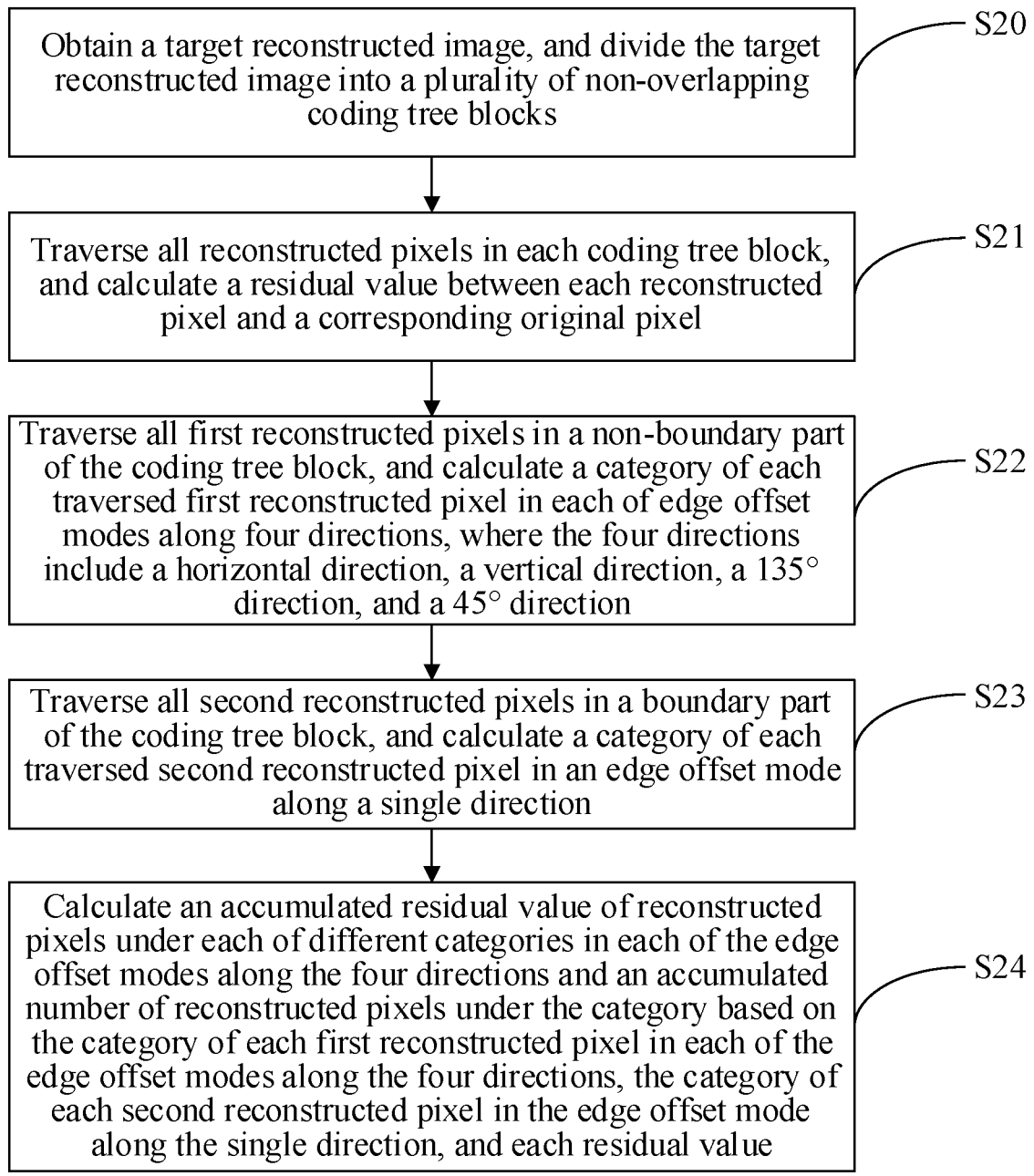
FIG. 2 is a flowchart of an embodiment of a method for data processing in an edge offset mode of sample adaptive offset according to the present application.

FIG. 2 is a schematic flowchart of a method for data processing in an edge offset mode of sample adaptive offset according to an embodiment of the present application. It may be understood that the flowchart in this method embodiment is not intended to limit an execution sequence of the steps. The following gives exemplary description by using a computer device as an execution body. It can be learned from the figure that the method for data processing in an edge offset mode of sample adaptive offset in this embodiment includes the following steps.

In step S20, a target reconstructed image is obtained, and the target reconstructed image is divided into a plurality of non-overlapping coding tree blocks.

In some embodiments, the target reconstructed image is an image obtained after a reconstructed image is deblocked, and is a frame of reconstructed image.

In this embodiment, when the target reconstructed image is divided into coding tree blocks, the entire frame of image is divided into blocks based on a size of a coding tree unit (CTU) preset by an encoder. For example, a size of the target reconstructed image is 128*128, and the size of the CTU is 64*64. In this case, the target reconstructed image may be divided into four non-overlapping coding tree blocks.

In step S21, all reconstructed pixels in each coding tree block are traversed, and a residual value between each reconstructed pixel and a corresponding original pixel is calculated.

In some embodiments, a coding tree block (CTB) may be a luma CTB or a chroma CTB included in a coding tree unit (CTU) in a sample adaptive offset (SAO) technology in HEVC. A coding tree block includes a plurality of reconstructed pixels.

It should be noted that a reconstructed pixel is a pixel obtained after each pixel in an original image is restored.

A residual value diff between each reconstructed pixel and a corresponding original pixel is a difference between a pixel value a of the reconstructed pixel and a pixel value b of the corresponding original pixel, that is, diff=a−b.

It can be understood that, in this embodiment of the present invention, to reduce a data processing time, residual values of all reconstructed pixels in the coding tree block may be calculated in advance, instead of calculating the residual values when the values need to be used.

In step S22, all first reconstructed pixels in a non-boundary part of the coding tree block are traversed, and a category of each traversed first reconstructed pixel in each of edge offset modes along four directions is calculated, where the four directions include a horizontal direction, a vertical direction, a 135° direction, and a 45° direction.

In some embodiments, the non-boundary part is relative to the boundary part, where the boundary part refers to the uppermost row, the lowermost row, the leftmost column, and the rightmost column in the coding tree block, and correspondingly, the non-boundary part is the part of the coding tree block except the uppermost row, the lowermost row, the leftmost column, and the rightmost column.

In this embodiment, all the first reconstructed pixels in the non-boundary part are all pixels in the coding tree block except the pixels in the uppermost row, the lowermost row, the leftmost column, and the rightmost column.

The edge offset (EO) mode may be divided into edge offset modes along four directions, namely, a horizontal direction (EO0), a vertical direction (EO1), a 135° direction (EO2), and a 45° direction (EO3).

As an example, the edge offset modes along the four directions are shown in FIG. 3. In FIG. 3, c represents a reconstructed pixel currently to be calculated, and a and b represent reference pixels of the reconstructed pixel currently to be calculated.

In each edge offset mode, each reconstructed pixel in the coding tree block may be classified into five different categories, namely, category0, category1, category2, category3, and category4, that is, a category 0, a category 1, a category 2, a category 3, and a category 4. The category 1 indicates that a pixel value of the reconstructed pixel currently to be calculated is less than pixel values of the two reference pixels, this category belongs to Positive offset, and an offset value is greater than or equal to 0. The category 2 indicates that a pixel value of the reconstructed pixel currently to be calculated is equal to a pixel value of one of the reference pixels and less than a pixel value of the other reference pixel, this category belongs to Positive offset, and an offset value is greater than or equal to 0. The category 3 indicates that a pixel value of the reconstructed pixel currently to be calculated is equal to a pixel value of one of the reference pixels and greater than a pixel value of the other reference pixel, this category belongs to Negative offset, and an offset value is less than or equal to 0. The category 4 indicates that a pixel value of the reconstructed pixel currently to be calculated is greater than pixel values of the two reference pixels, this category belongs to Negative offset, and an offset value is less than or equal to 0. The category 0 indicates that a pixel value of the reconstructed pixel currently to be calculated falls outside of the above four cases, and a reconstructed pixel belonging to this category does not need pixel compensation.

In this embodiment, after each first reconstructed pixel is traversed, the categories of the first reconstructed pixel in the edge offset modes along the four directions can be calculated at a time by using one preset function, without a need to use a plurality of functions to calculate the categories in the edge offset modes along the directions.

In step S23, all second reconstructed pixels in a boundary part of the coding tree block are traversed, and a category of each traversed second reconstructed pixel in an edge offset mode along a single direction is calculated.

In some embodiments, since a pixel in the boundary part has an edge offset mode along only one direction, to calculate a category of each second reconstructed pixel, it is only necessary to calculate the category of the second pixel in the edge offset mode along the corresponding direction. For example, if a second reconstructed pixel currently to be calculated is a pixel in the uppermost row of the boundary part, because a pixel in the uppermost row has only the edge offset mode along the horizontal direction (EO0), only a category in the edge offset mode along the horizontal direction may be calculated for the second reconstructed pixel in the uppermost row. If a second reconstructed pixel currently to be calculated is a pixel in the lowermost row of the boundary part, because a pixel in the lowermost row also has only the edge offset mode along the horizontal direction, only a category in the edge offset mode along the horizontal direction may be calculated for the second reconstructed pixel in the lowermost row. If a second reconstructed pixel currently to be calculated is a pixel in the leftmost column of the boundary part, because a pixel in the leftmost column has only the edge offset mode along the vertical direction (EO1), only a category in the edge offset mode along the vertical direction may be calculated for the second reconstructed pixel in the leftmost column. If a second reconstructed pixel currently to be calculated is a pixel in the rightmost column of the boundary part, because a pixel in the rightmost column also has only the edge offset mode along the vertical direction (EO1), only a category in the edge offset mode along the vertical direction may be calculated for the second reconstructed pixel in the rightmost column.

It can be understood that categories of the second pixels in the boundary part in the edge offset modes along the other directions may not be calculated. Alternatively, to ensure that each pixel has categories in all the edge offset modes along the four directions, the categories of the second pixels in the boundary part in the edge offset modes along the other directions may be represented by a preset value. It can be understood that the preset value cannot be the same as values representing the categories in the edge offset modes.

In step S24, an accumulated residual value of reconstructed pixels under each of different categories in each of the edge offset modes along the four directions and an accumulated number of reconstructed pixels under the category are calculated based on the category of each first reconstructed pixel in each of the edge offset modes along the four directions, the category of each second reconstructed pixel in the edge offset mode along the single direction, and each residual value.

In some embodiments, the accumulated residual value is an accumulated sum of residual values between all reconstructed pixels under the same category in the edge offset mode along each direction and their corresponding original pixels. In other words, the accumulated residual value includes an accumulated sum of residual values between all reconstructed pixels under the category 0 in the EO0 mode and their corresponding original pixels, an accumulated sum of residual values between all reconstructed pixels under the category 1 in the EO0 mode and their corresponding original pixels, an accumulated sum of residual values between all reconstructed pixels under the category 2 in the EO0 mode and their corresponding original pixels, an accumulated sum of residual values between all reconstructed pixels under the category 3 in the EO0 mode and their corresponding original pixels, an accumulated sum of residual values between all reconstructed pixels under the category 4 in the EO0 mode and their corresponding original pixels, an accumulated sum of residual values between all reconstructed pixels under the category 0 in the EO1 mode and their corresponding original pixels, an accumulated sum of residual values between all reconstructed pixels under the category 1 in the EO1 mode and their corresponding original pixels, an accumulated sum of residual values between all reconstructed pixels under the category 2 in the EO1 mode and their corresponding original pixels, an accumulated sum of residual values between all reconstructed pixels under the category 3 in the EO1 mode and their corresponding original pixels, an accumulated sum of residual values between all reconstructed pixels under the category 4 in the EO1 mode and their corresponding original pixels, an accumulated sum of residual values between all reconstructed pixels under the category 0 in the EO2 mode and their corresponding original pixels, an accumulated sum of residual values between all reconstructed pixels under the category 1 in the EO2 mode and their corresponding original pixels, an accumulated sum of residual values between all reconstructed pixels under the category 2 in the EO2 mode and their corresponding original pixels, an accumulated sum of residual values between all reconstructed pixels under the category 3 in the EO2 mode and their corresponding original pixels, an accumulated sum of residual values between all reconstructed pixels under the category 4 in the EO2 mode and their corresponding original pixels, an accumulated sum of residual values between all reconstructed pixels under the category 0 in the EO3 mode and their corresponding original pixels, an accumulated sum of residual values between all reconstructed pixels under the category 1 in the EO3 mode and their corresponding original pixels, an accumulated sum of residual values between all reconstructed pixels under the category 2 in the EO3 mode and their corresponding original pixels, an accumulated sum of residual values between all reconstructed pixels under the category 3 in the EO3 mode and their corresponding original pixels, and an accumulated sum of residual values between all reconstructed pixels under the category 4 in the EO3 mode and their corresponding original pixels.

The accumulated number is the number of all reconstructed pixels under the same category in the edge offset mode along each direction. For example, if there are eight reconstructed pixels under the category 0 in the EO0 mode, the accumulated number is 8; and if there are five reconstructed pixels under the category 2 in the EO1 mode, the accumulated number is 5.

In this embodiment, to calculate an accumulated residual value of reconstructed pixels under each category in each EO mode, the reconstructed pixels may be found first, then corresponding residual values of the found pixels are found from the calculated residual values, and finally, all the corresponding residual values are accumulated to obtain the accumulated residual value under the category x (x is 0, 1, 2, 3, or 4) in the EO mode, and the number of pixels is calculated at the same time.

As an example, assuming that there are eight reconstructed pixels under the category 0 in the EO0 mode, and residual values between the eight reconstructed pixels and their corresponding original pixels are 5, 8, 7, 6, 4, 3, 12, and 9, the accumulated residual value=5+8+7+6+4+3+12+9=54, and the accumulated number is 8; and assuming that there are five reconstructed pixels under the category 2 in the EO1 mode, and residual values between the five reconstructed pixels and their corresponding original pixels are 5, 8, 7, 6, and 4, the accumulated residual value=5+8+7+6+4=30, and the accumulated number is 5.

In this embodiment of the present application, a target reconstructed image is obtained, and the target reconstructed image is divided into a plurality of non-overlapping coding tree blocks; all reconstructed pixels in each coding tree block are traversed, and a residual value between each reconstructed pixel and a corresponding original pixel is calculated; all first reconstructed pixels in a non-boundary part of the coding tree block are traversed, and a category of each traversed first reconstructed pixel in each of edge offset modes along four directions is calculated, where the four directions include a horizontal direction, a vertical direction, a 135° direction, and a 45° direction; all second reconstructed pixels in a boundary part of the coding tree block are traversed, and a category of each traversed second reconstructed pixel in an edge offset mode along a single direction is calculated; and an accumulated residual value of reconstructed pixels under each of different categories in each of the edge offset modes along the four directions and an accumulated number of reconstructed pixels under the category are calculated based on the category of each first reconstructed pixel in each of the edge offset modes along the four directions, the category of each second reconstructed pixel in the edge offset mode along the single direction, and each residual value. In the embodiments of the present application, the categories of each reconstructed pixel in the edge offset modes along the four directions are calculated at a time, so that the calculation of the categories of each reconstructed pixel in the edge offset modes along the four directions can be completed by spending a little more time than ¼ of that spent before, greatly reducing the computing time.

According to experimental statistics, through the calculation method of the present application, the EO means can be accelerated by about 32.8%, and can be accelerated by about 3.28% when applied to live streaming scenarios, reducing a live streaming delay.

In an exemplary implementation, referring to FIG. 4, the step of calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value may include steps S40 to S42.

In step S40, all the first reconstructed pixels are traversed, and the category of each first reconstructed pixel in each of the edge offset modes along the four directions are stored into a variable in a concatenation manner.

In some embodiments, the category of each first reconstructed pixel in each EO direction may be represented by m bits, since there are only five categories in total, a minimum value of m in this embodiment may be 3, that is, each of the five categories may be represented at least by a 3-bit value, and in this case, the categories of each pixel in the four EO directions may be fully represented by only 12 bits.

It can be understood that, in a computer system, a piece of data is represented by 12 bits, which is inconvenient during processing. Therefore, in this embodiment, to facilitate subsequent processing of category data, the value of m is preferably 4, that is, the categories of each reconstructed pixel in the four EO directions are represented by a 16-bit value. Certainly, in other implementations of the present application, the value of m may alternatively be 8, and the categories in the four EO directions are represented by a 32-bit value. In this implementation, the value of m is not limited.

As an example, when the value of m is 4, the category of each first reconstructed pixel in each of the edge offset modes along the four directions may be stored into a 16-bit variable in a concatenation manner, for example, stored into a 16-bit variable et in a concatenation manner. It should be noted that the variable may be a global variable or a local variable, which is not limited in this embodiment.

In step S41, the category of each first reconstructed pixel in each of the edge offset modes along the four directions is obtained from the variable.

In some embodiments, since the variable includes the categories of each first reconstructed pixel in the edge offset modes along the four directions, information about the categories may be directly extracted when needed.

In step S42, an accumulated residual value of reconstructed pixels under each of different categories in each of the edge offset modes along the four directions is calculated based on the category of each first reconstructed pixel in each of the edge offset modes along the four directions, the category of each second reconstructed pixel in the edge offset mode along the single direction, and each residual value.

In some embodiments, this step is the same as step S23, and will not be described in detail in this embodiment.

In this embodiment, the category values of each first reconstructed pixel in the four EO modes are combined into one variable, so that an amount of data to be stored and transmitted can be reduced.

In an exemplary implementation, the calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value may further include:

traversing all the second reconstructed pixels, and storing the category of each second reconstructed pixel in the edge offset mode along the single direction into the variable in a concatenation manner, where a category of each second reconstructed pixel in each of the edge offset modes along the other directions is represented by a preset value.

To facilitate subsequent processing of the category information of all reconstructed pixels, in this embodiment, category information of each second reconstructed pixel in the edge offset mode along only a single direction may also be concatenated to have a value with the same bits as the category information of the first reconstructed pixel, and the concatenated category information is also stored into the variable.

The single direction refers to an EO mode of a current second reconstructed pixel. In some embodiments, if the current second reconstructed pixel is a pixel in the uppermost row or the lowermost row, the single direction is the horizontal direction (EO0); or if the current second reconstructed pixel is a pixel in the leftmost column or the rightmost column, the single direction is the vertical direction (EO1).

The other directions are directions of the current second reconstructed pixel different from the single direction. In some embodiments, if the current second reconstructed pixel is a pixel in the uppermost row or the lowermost row, the other directions are the vertical direction (EO1), the 135° direction (EO2), and the 45° direction (EO3); or if the current second reconstructed pixel is a pixel in the leftmost column or the rightmost column, the other directions are the horizontal direction (EO0), the 135° direction (EO2), and the 45° direction (EO3).

As an example, assuming that each category is represented by four bits, the category in the EO0 mode is represented by the $1^{st}$ bit to the $4^{th}$ bit in the variable, the category in the EO1 mode is represented by the $5^{th}$ bit to the $8^{th}$ bit in the variable, the category in the EO2 mode is represented by the $9^{th}$ bit to the $12^{th}$ bit in the variable, and the category in the EO3 mode is represented by the $13^{th}$ bit to the $16^{th}$ bit in the variable, the category of each second reconstructed pixel in the edge offset mode along a single direction may be stored at corresponding positions in the variable in a concatenated manner when category concatenation is performed, and the preset value is added to the other positions in the variable. For example, if the category is the category of the second reconstructed pixel in the EO0 mode, a value representing the category may be added to the $1^{st}$ bit to the $4^{th}$ bit in the variable, and the other bits in the variable may be represented by the preset value. For another example, if the category is the category of the second reconstructed pixel in the EO1 mode, a value representing the category may be added to the $5^{th}$ bit to the $8^{th}$ bit in the variable, and the other bits in the variable may also be represented by the preset value.

It should be noted that the preset value is a preset or default value, and the preset value needs to be different from the values of the categories, for example, if the values corresponding to the five categories are 0, 1, 2, 3, and 4, the preset value may be 5, 6, 7, 8, etc.

The obtaining, from the variable, the category of each first reconstructed pixel in each of the edge offset modes along the four directions includes:

obtaining, from the variable, the categories of all the reconstructed pixels in the edge offset modes along the four directions.

In some embodiments, when the variable includes categories of a first reconstructed pixel and a second reconstructed pixel, the categories of all the reconstructed pixels in the edge offset modes along the four directions can be obtained from the variable when the categories need to be obtained.

In an exemplary implementation, the obtaining, from the variable, the categories of all the reconstructed pixels in the edge offset modes along the four directions may include:
performing an and operation on the variable and a preset 16-bit value, and using an operation result as a category, stored in the variable, of each reconstructed pixel in an edge offset mode along one direction;
performing a 4-bit shift on the variable to obtain an updated variable;
performing an and operation on the updated variable and the preset 16-bit value, and using an operation result as a category of the reconstructed pixel in an edge offset mode along another direction; and
returning to perform the step of performing a 4-bit shift on the variable to obtain an updated variable, until the categories of each reconstructed pixel in the edge offset modes along all the directions are obtained.

In some embodiments, the preset 16-bit value may be 0x000f or 0xf000.

As an example, when the preset 16-bit value is 0x000f, an "& (and)" operation can be performed on the variable et and 0x000f to obtain the four least significant bits of the original variable et, so that a category of each reconstructed pixel in the EO0 mode is obtained from the variable et, and an accumulated residual value and an accumulated number for each category in the EO0 mode can be subsequently calculated separately. After the accumulated residual value and the accumulated number for each category in the EO0 mode are calculated, a 4-bit right shift can be performed on the variable et, and an "&" operation can be performed on the shifted variable et and 0x000f to obtain the $5^{th}$ bit to the $8^{th}$ bit of the original variable et, so that a category of each reconstructed pixel in the EO1 mode is obtained from the variable et, and an accumulated residual value and an accumulated number for each category in the EO1 mode can be subsequently calculated separately. After the accumulated residual value and the accumulated number for each category in the EO1 mode are calculated, a 4-bit right shift can continue to be performed on the variable et, and an "&" operation can be performed on the shifted variable et and 0x000f to obtain the $9^{th}$ bit to the $12^{th}$ bit of the original variable et, so that a category of each reconstructed pixel in the EO2 mode is obtained from the variable et, and an accumulated residual value and an accumulated number for each category in the EO2 mode can be subsequently calculated separately. After the accumulated residual value and the accumulated number for each category in the EO2 mode are calculated, a 4-bit right shift can continue to be performed on the variable et, and an "&" operation can be performed on the shifted variable et and 0x000f to obtain the $13^{th}$ bit to the $16^{th}$ bit of the original variable et, namely, the four most significant bits, so that a category of each reconstructed pixel in the EO3 mode is obtained from the variable et, and an accumulated residual value and an accumulated number for each category in the EO3 mode can be subsequently calculated separately.

In an exemplary implementation, when the preset 16-bit value is 0x000f, the performing a 4-bit shift on the variable to obtain an updated variable includes:
performing a 4-bit right shift on the variable to obtain an updated variable.

As an example, if a category included in the variable is 0x378B, the category after the right shift is 0x0378.

It can be understood that when the shift is performed, all the categories included in the variable need to be shifted.

In an exemplary implementation, when the preset 16-bit value is 0xf000, the performing a 4-bit shift on the variable to obtain an updated variable includes:
performing a 4-bit left shift on the variable to obtain an updated variable.

As an example, if a category included in the variable is 0x378B, the category after the left shift is 0x78B0.

It can be understood that when the shift is performed, all the categories included in the variable need to be shifted.

In an exemplary implementation, the step of calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value includes:

calculating an accumulated residual value of reconstructed pixels under each of all the categories except a preset category in each of the edge offset modes along the four directions based on the category of each first reconstructed pixel in each of the edge offset modes along the four directions, the category of each second reconstructed pixel in the edge offset mode along the single direction, and each residual value.

In some embodiments, the preset category is the category 0 in the above embodiment. In this embodiment, since pixel compensation does not need to be performed for the reconstructed pixels under the category 0, that is, the calculation results of the accumulated residual value and the accumulated number of the reconstructed pixels under the category 0 are useless. Therefore, in this embodiment, during the calculation of accumulated residual values, only the accumulated residual values for all the categories except the category 0 can be calculated to reduce the calculation amount, that is, an accumulated residual value of reconstructed pixels under the category 0 is not calculated.

FIG. 5 is a diagram of program means of an embodiment of an apparatus 50 for data processing in an edge offset mode of sample adaptive offset according to the present application.

In this embodiment, the apparatus 50 for data processing in an edge offset mode of sample adaptive offset includes a series of computer-readable instructions stored in a memory. When the computer-readable instructions are executed by a processor, the function for data processing in an edge offset mode of sample adaptive offset according to each embodiment of the present application can be implemented. In some embodiments, the apparatus 50 for data processing in an edge offset mode of sample adaptive offset may be divided into one or more means based on some operations implemented by various parts of the computer-readable instructions. For example, in FIG. 5, the apparatus 50 for data processing in an edge offset mode of sample adaptive offset may be divided into an obtaining means 51, a first traversal means 52, a second traversal means 53, a third traversal means 54, and a calculation means 55.

The obtaining means 51 is configured to obtain a target reconstructed image, and divide the target reconstructed image into a plurality of non-overlapping coding tree blocks.

The first traversal means 52 is configured to traverse all reconstructed pixels in each coding tree block, and calculate a residual value between each reconstructed pixel and a corresponding original pixel.

The second traversal means 53 is configured to traverse all first reconstructed pixels in a non-boundary part of the coding tree block, and calculate a category of each traversed first reconstructed pixel in each of edge offset modes along four directions, where the four directions include a horizontal direction, a vertical direction, a 135° direction, and a 45° direction.

The third traversal means 54 is configured to traverse all second reconstructed pixels in a boundary part of the coding tree block, and calculate a category of each traversed second reconstructed pixel in an edge offset mode along a single direction.

The calculation means 55 is configured to calculate an accumulated residual value of reconstructed pixels under each of different categories in each of the edge offset modes along the four directions and an accumulated number of reconstructed pixels under the category based on the category of each first reconstructed pixel in each of the edge offset modes along the four directions, the category of each second reconstructed pixel in the edge offset mode along the single direction, and each residual value.

In an exemplary implementation, the calculation means 55 is further configured to: traverse all the first reconstructed pixels, and store the category of each first reconstructed pixel in each of the edge offset modes along the four directions into a variable in a concatenation manner; obtain, from the variable, the category of each first reconstructed pixel in each of the edge offset modes along the four directions; and calculate an accumulated residual value of reconstructed pixels under each of the different categories in each of the edge offset modes along the four directions based on the category of each first reconstructed pixel in each of the edge offset modes along the four directions, the category of each second reconstructed pixel in the edge offset mode along the single direction, and each residual value.

In an exemplary implementation, the calculation means 55 is further configured to traverse all the second reconstructed pixels, and store the category of each second reconstructed pixel in the edge offset mode along the single direction into the variable in a concatenation manner, where a category of each second reconstructed pixel in each of the edge offset modes along the other directions is represented by a preset value.

The calculation means 55 is further configured to obtain, from the variable, the categories of all the reconstructed pixels in the edge offset modes along the four directions.

In an exemplary implementation, there are five categories, each category is represented by four bits, and the categories of each reconstructed pixel in the edge offset modes along the four directions are represented by 16 bits.

In an exemplary implementation, the calculation means 55 is further configured to: perform an and operation on the variable and a preset 16-bit value, and use an operation result as a category, stored in the variable, of each reconstructed pixel in an edge offset mode along one direction; perform a 4-bit shift on the variable to obtain an updated variable; perform an and operation on the updated variable and the preset 16-bit value, and use an operation result as a category of the reconstructed pixel in an edge offset mode along another direction; and return to perform the step of performing a 4-bit shift on the variable to obtain an updated variable, until the categories of each reconstructed pixel in the edge offset modes along all the directions are obtained.

In an exemplary implementation, when the preset 16-bit value is 0x000f, the calculation means 55 is further configured to perform a 4-bit right shift on the variable to obtain an updated variable.

In an exemplary implementation, when the preset 16-bit value is 0xf000, the calculation means 55 is further configured to perform a 4-bit left shift on the variable to obtain an updated variable.

In this embodiment of the present application, all reconstructed pixels in each coding tree block are traversed, and a residual value between each reconstructed pixel and a corresponding original pixel is calculated; all first reconstructed pixels in a non-boundary part of the coding tree block are traversed, and a category of each traversed first reconstructed pixel in each of edge offset modes along four directions is calculated, where the four directions include a horizontal direction, a vertical direction, a 135° direction, and a 45° direction. all second reconstructed pixels in a boundary part of the coding tree block are traversed, and a category of each traversed second reconstructed pixel in an edge offset mode along a single direction is calculated; and an accumulated residual value of reconstructed pixels under each of different categories in each of the edge offset modes along the four directions and an accumulated number of reconstructed pixels under the category are calculated based on the category of each first reconstructed pixel in each of the edge offset modes along the four directions, the category of each second reconstructed pixel in the edge offset mode along the single direction, and each residual value. In the embodiments of the present application, the categories of each reconstructed pixel in the edge offset modes along the four directions are calculated at a time, so that the calculation of the categories of each reconstructed pixel in the edge offset modes along the four directions can be completed by spending a little more time than ¼ of that spent before, greatly reducing the computing time.

Figure 6:
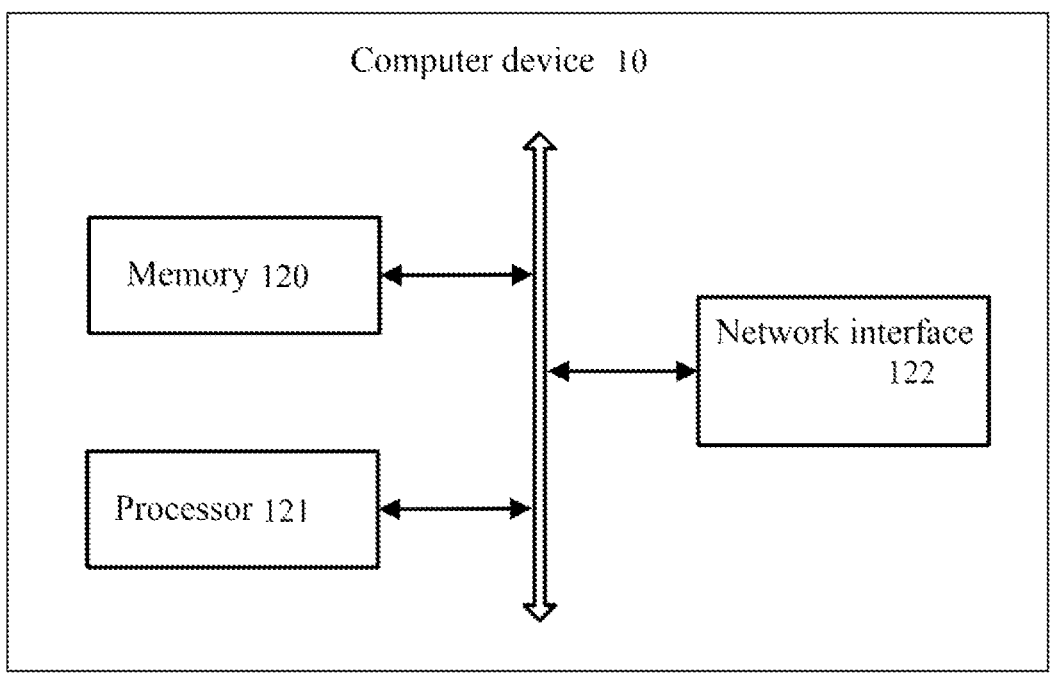
FIG. 6 is a schematic diagram of a hardware structure of a computer device for performing a method for data processing in an edge offset mode of sample adaptive offset according to an embodiment of the present application.

FIG. 6 is a schematic diagram of a hardware architecture of a computer device 10 suitable for performing a method for data processing in an edge offset mode of sample adaptive offset according to an embodiment of the present application. In this embodiment, the computer device 10 is a device that can automatically perform numerical calculation and/or information processing according to preset or prestored instructions. For example, the computer device may be a tablet computer, a notebook computer, a desktop computer, a rack server, a blade server, a tower server, a cabinet server (including an independent server, or a server cluster composed of a plurality of servers), etc. As shown in FIG. 6, the computer device 10 at least includes, but is not limited to: a memory 120, a processor 121, and a network interface 122, which may be communicatively linked to each other by using a system bus.

The memory 120 includes at least one type of computer-readable storage medium. The readable storage medium may be volatile or non-volatile. In some embodiments, the readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 120 may be an internal storage means of the computer device 10, for example, a hard disk or memory of the computer device 10. In some other embodiments, the memory 120 may alternatively be an external storage device of the computer device 10, for example, a plug-in type hard disk equipped on the computer device 10, a smart media card (SMC for short), a secure digital (SD for short) card, or a flash card. Certainly, the memory 120 may alternatively include both the internal storage means of the computer device 10 and the external storage device of the computer device. In this embodiment, the memory 120 is generally configured to store an operating system and various application software installed on the computer device 10, such as program code for a method for data processing in an edge offset mode of sample adaptive offset. In addition, the memory 120 may be further configured to temporarily store various types of data that have been output or are to be output.

In some embodiments, the processor 121 may be a central processing unit (CPU for short), a controller, a microcontroller, a microprocessor, or other chips for data processing in an edge offset mode of sample adaptive offset. The processor 121 is generally configured to control overall operation of the computer device 10, for example, execute control, processing, and the like related to data interaction or communication with the computer device 10. In this embodiment, the processor 121 is configured to run program code stored in the memory 120 or to process data.

The network interface 122 may include a wireless network interface or a wired network interface. The network interface 122 is generally configured to establish a communication link between the computer device 10 and other computer devices. For example, the network interface 122 is configured to connect the computer device 10 to an external terminal by using a network, and establish a data transmission channel, a communication link, and the like between the computer device 10 and the external terminal. The network may be a wireless or wired network, such as Intranet, Internet, the Global System for Mobile Communications (GSM for short), wideband code division multiple access (WCDMA for short), a 4G network, a 5G network, Bluetooth, or Wi-Fi.

It should be noted that FIG. 6 shows only a computer device having components 120 to 122, but it should be understood that not all of the illustrated components are required to be implemented, and more or fewer components may be implemented instead.

In this embodiment, the method for data processing in an edge offset mode of sample adaptive offset stored in the memory 120 may alternatively be divided into one or more program means and executed by one or more processors (by the processor 121 in this embodiment) to implement the present application.

An embodiment of the present application provides a computer-readable storage medium having a computer-readable instructions stored thereon, where when the computer-readable instructions are executed by a processor, the steps of the method for data processing in an edge offset mode of sample adaptive offset in the embodiments are implemented.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may alternatively be an external storage device of the computer device, for example, a plug-in type hard disk equipped on the computer device, a smart media card (SMC for short), a secure digital (SD for short) card, or a flash card. Certainly, the computer-readable storage medium may alternatively include both the internal storage unit of the computer device and the external storage device of the computer device. In this embodiment, the computer-readable storage medium is generally configured to store an operating system and various application software installed on the computer device, such as program code for a method for data processing in an edge offset mode of sample adaptive offset in the embodiments. In addition, the computer-readable storage medium may be configured to temporarily store various types of data that have been output or are to be output.

The apparatus embodiments described above are merely exemplary, where units illustrated as separate components may be or may not be physically separated, and the components illustrated as units may be or may not be physical units. That is, the components may be positioned at one place or distributed on at least two network units. The object of the solutions in the embodiments of the present application can be achieved by selecting some or all of the means therein according to actual needs. Those of ordinary skill in the art can understand and implement the solutions without any creative effort.

Through the descriptions of the above implementations, those of ordinary skill in the art can clearly understand that the implementations can be implemented by software and general hardware platforms. Definitely, the implementations can also be implemented by hardware. Those of ordinary skill in the art can understand that all or some of the procedures in the methods of the foregoing embodiments can be implemented by computer-readable instructions to instruct related hardware. The program can be stored in a computer-readable storage medium. The program, when executed, may include the procedures in the above method embodiments. The storage medium may be a magnetic disk, an optical disc, a read-only memory (ROM), or a random access memory (RAM).

Finally, it should be noted that the above embodiments are merely used for illustrating rather than limiting the technical solutions of the present application. Although the present application is described in detail with reference to the foregoing embodiments, those of ordinary skill in the art should understand that the technical solutions specified in the above embodiments can still be modified, or some or all of the technical features therein can be equivalently substituted; and such modifications or substitutions do not make the essence of the corresponding technical solutions depart from the scope of the technical solutions of the embodiments of the present application.

What is claimed is:

1. A method, comprising:
    obtaining a target reconstructed image, and dividing the target reconstructed image into a plurality of non-overlapping coding tree blocks;
    traversing all reconstructed pixels in each coding tree block, and calculating a residual value between each reconstructed pixel and a corresponding original pixel;
    traversing all first reconstructed pixels in a non-boundary part of the coding tree block, and calculating a category of each traversed first reconstructed pixel in each of edge offset modes along four directions, wherein the four directions comprise a horizontal direction, a vertical direction, a 135° direction, and a 45° direction, and storing the category of each first reconstructed pixel in each of the edge offset modes along the four directions into one variable in a concatenation manner;
    traversing all second reconstructed pixels in a boundary part of the coding tree block, and calculating a category of each traversed second reconstructed pixel in an edge offset mode along a single direction; and
    calculating an accumulated residual value of reconstructed pixels under each of different categories in each of the edge offset modes along the four directions and an accumulated number of reconstructed pixels under the category based on the category of each first reconstructed pixel in each of the edge offset modes along the four directions, the category of each second reconstructed pixel in the edge offset mode along the single direction, and each residual value comprising:
        obtaining, from the variable, the category of each first reconstructed pixel in each of the edge offset modes along the four directions; and
        calculating the accumulated residual value of reconstructed pixels under each of the different categories in each of the edge offset modes along the four directions based on the category of each first reconstructed pixel in each of the edge offset modes along the four directions, the category of each second reconstructed pixel in the edge offset mode along the single direction, and each residual value.

2. The method according to claim 1, wherein the calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value further comprises:
    traversing all the second reconstructed pixels, and storing the category of each second reconstructed pixel in the edge offset mode along the single direction into the variable in a concatenation manner, wherein a category of each second reconstructed pixel in each of the edge offset modes along the other directions is represented by a preset value; and
    the obtaining, from the variable, the category of each first reconstructed pixel in each of the edge offset modes along the four directions comprises:
        obtaining, from the variable, the categories of all the reconstructed pixels in the edge offset modes along the four directions.

3. The method according to claim 2, wherein there are five categories, each category is represented by four bits, the categories of each reconstructed pixel in the edge offset modes along the four directions are represented by 16 bits, and the obtaining, from the variable, the categories of all the reconstructed pixels in the edge offset modes along the four directions comprises:
    performing an and operation on the variable and a preset 16-bit value to obtain a category, stored in the variable, of each reconstructed pixel in an edge offset mode along one direction;
    performing a 4-bit shift on the variable to obtain an updated variable;
    performing an and operation on the updated variable and the preset 16-bit value to obtain a category of the reconstructed pixel in an edge offset mode along another direction; and
    returning to perform the step of performing a 4-bit shift on the variable to obtain an updated variable, until the categories of each reconstructed pixel in the edge offset modes along all the directions are obtained.

4. The method according to claim 3, wherein the preset 16-bit value is 0x000f, and the performing a 4-bit shift on the variable to obtain an updated variable comprises:
    performing a 4-bit right shift on the variable to obtain an updated variable.

5. The method according to claim 3, wherein the preset 16-bit value is 0xf000, and the performing a 4-bit shift on the variable to obtain an updated variable comprises:
    performing a 4-bit left shift on the variable to obtain an updated variable.

6. The method according to claim 3, wherein the step of calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value comprises:
calculating an accumulated residual value of reconstructed pixels under each of all the categories except a preset category in each of the edge offset modes along the four directions based on the category of each first reconstructed pixel in each of the edge offset modes along the four directions, the category of each second reconstructed pixel in the edge offset mode along the single direction, and each residual value.

7. A computer device, comprising:
a memory, a processor, and computer-readable instructions stored in the memory and capable of running on the processor, wherein when the processor executes the computer-readable instructions, the processor performs operations comprising:
obtaining a target reconstructed image, and dividing the target reconstructed image into a plurality of non-overlapping coding tree blocks;
traversing all reconstructed pixels in each coding tree block, and calculating a residual value between each reconstructed pixel and a corresponding original pixel;
traversing all first reconstructed pixels in a non-boundary part of the coding tree block, and calculating a category of each traversed first reconstructed pixel in each of edge offset modes along four directions, wherein the four directions comprise a horizontal direction, a vertical direction, a 135° direction, and a 45° direction, and storing the category of each first reconstructed pixel in each of the edge offset modes along the four directions into one variable in a concatenation manner;
traversing all second reconstructed pixels in a boundary part of the coding tree block, and calculating a category of each traversed second reconstructed pixel in an edge offset mode along a single direction; and
calculating an accumulated residual value of reconstructed pixels under each of different categories in each of the edge offset modes along the four directions and an accumulated number of reconstructed pixels under the category based on the category of each first reconstructed pixel in each of the edge offset modes along the four directions, the category of each second reconstructed pixel in the edge offset mode along the single direction, and each residual value comprising:
obtaining, from the variable, the category of each first reconstructed pixel in each of the edge offset modes along the four directions; and
calculating the accumulated residual value of reconstructed pixels under each of the different categories in each of the edge offset modes along the four directions based on the category of each first reconstructed pixel in each of the edge offset modes along the four directions, the category of each second reconstructed pixel in the edge offset mode along the single direction, and each residual value.

8. The computer device according to claim 7, wherein the calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value further comprises:
traversing all the second reconstructed pixels, and storing the category of each second reconstructed pixel in the edge offset mode along the single direction into the variable in a concatenation manner, wherein a category of each second reconstructed pixel in each of the edge offset modes along the other directions is represented by a preset value; and
the obtaining, from the variable, the category of each first reconstructed pixel in each of the edge offset modes along the four directions comprises:
obtaining, from the variable, the categories of all the reconstructed pixels in the edge offset modes along the four directions.

9. The computer device according to claim 8, wherein there are five categories, each category is represented by four bits, the categories of each reconstructed pixel in the edge offset modes along the four directions are represented by 16 bits, and the obtaining, from the variable, the categories of all the reconstructed pixels in the edge offset modes along the four directions comprises:
performing an and operation on the variable and a preset 16-bit value to obtain a category, stored in the variable, of each reconstructed pixel in an edge offset mode along one direction;
performing a 4-bit shift on the variable to obtain an updated variable;
performing an and operation on the updated variable and the preset 16-bit value to obtain a category of the reconstructed pixel in an edge offset mode along another direction; and
returning to perform the step of performing a 4-bit shift on the variable to obtain an updated variable, until the categories of each reconstructed pixel in the edge offset modes along all the directions are obtained.

10. The computer device according to claim 9, wherein the preset 16-bit value is 0x000f, and the performing a 4-bit shift on the variable to obtain an updated variable comprises:
performing a 4-bit right shift on the variable to obtain an updated variable.

11. The computer device according to claim 9, wherein the preset 16-bit value is 0xf000, and the performing a 4-bit shift on the variable to obtain an updated variable comprises:
performing a 4-bit left shift on the variable to obtain an updated variable.

12. The computer device according to claim 9, wherein the step of calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value comprises:
calculating an accumulated residual value of reconstructed pixels under each of all the categories except a preset category in each of the edge offset modes along the four directions based on the category of each first reconstructed pixel in each of the edge offset modes along the four directions, the category of each second reconstructed pixel in the edge offset mode along the single direction, and each residual value.

13. A non-transitory computer-readable storage medium, having computer-readable instructions stored thereon, wherein when the computer-readable instructions are executed by a processor, the processor performs operations comprising:
obtaining a target reconstructed image, and dividing the target reconstructed image into a plurality of non-overlapping coding tree blocks;

traversing all reconstructed pixels in each coding tree block, and calculating a residual value between each reconstructed pixel and a corresponding original pixel;

traversing all first reconstructed pixels in a non-boundary part of the coding tree block, and calculating a category of each traversed first reconstructed pixel in each of edge offset modes along four directions, wherein the four directions comprise a horizontal direction, a vertical direction, a 135° direction, and a 45° direction, and storing the category of each first reconstructed pixel in each of the edge offset modes along the four directions into one variable in a concatenation manner;

traversing all second reconstructed pixels in a boundary part of the coding tree block, and calculating a category of each traversed second reconstructed pixel in an edge offset mode along a single direction; and calculating an accumulated residual value of reconstructed pixels under each of different categories in each of the edge offset modes along the four directions and an accumulated number of reconstructed pixels under the category based on the category of each first reconstructed pixel in each of the edge offset modes along the four directions, the category of each second reconstructed pixel in the edge offset mode along the single direction, and each residual value comprising:

obtaining, from the variable, the category of each first reconstructed pixel in each of the edge offset modes along the four directions; and calculating the accumulated residual value of reconstructed pixels under each of the different categories in each of the edge offset modes along the four directions based on the category of each first reconstructed pixel in each of the edge offset modes along the four directions, the category of each second reconstructed pixel in the edge offset mode along the single direction, and each residual value.

14. The non-transitory computer-readable storage medium according to claim 13, wherein the calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value further comprises:

traversing all the second reconstructed pixels, and storing the category of each second reconstructed pixel in the edge offset mode along the single direction into the variable in a concatenation manner, wherein a category of each second reconstructed pixel in each of the edge offset modes along the other directions is represented by a preset value; and the obtaining, from the variable, the category of each first reconstructed pixel in each of the edge offset modes along the four directions comprises:

obtaining, from the variable, the categories of all the reconstructed pixels in the edge offset modes along the four directions.

15. The non-transitory computer-readable storage medium according to claim 14, wherein there are five categories, each category is represented by four bits, the categories of each reconstructed pixel in the edge offset modes along the four directions are represented by 16 bits, and the obtaining, from the variable, the categories of all the reconstructed pixels in the edge offset modes along the four directions comprises:

performing an and operation on the variable and a preset 16-bit value to obtain a category, stored in the variable, of each reconstructed pixel in an edge offset mode along one direction;

performing a 4-bit shift on the variable to obtain an updated variable;

performing an and operation on the updated variable and the preset 16-bit value to obtain a category of the reconstructed pixel in an edge offset mode along another direction; and returning to perform the step of performing a 4-bit shift on the variable to obtain an updated variable, until the categories of each reconstructed pixel in the edge offset modes along all the directions are obtained.

16. The non-transitory computer-readable storage medium according to claim 15, wherein the preset 16-bit value is 0x000f, and the performing a 4-bit shift on the variable to obtain an updated variable comprises:

performing a 4-bit right shift on the variable to obtain an updated variable; or wherein the preset 16-bit value is 0xf000, and the performing a 4-bit shift on the variable to obtain an updated variable comprises:

performing a 4-bit left shift on the variable to obtain an updated variable.

17. The non-transitory computer-readable storage medium according to claim 15, wherein the step of calculating an accumulated residual value of reconstructed pixels under each of different categories in each of the edge offset modes along the four directions based on the category of each first reconstructed pixel in each of the edge offset modes along the four directions, the category of each second reconstructed pixel in the edge offset mode along the single direction, and each residual value comprises:

calculating an accumulated residual value of reconstructed pixels under each of all the categories except a preset category in each of the edge offset modes along the four directions based on the category of each first reconstructed pixel in each of the edge offset modes along the four directions, the category of each second reconstructed pixel in the edge offset mode along the single direction, and each residual value.

* * * * *